United States Patent Office 3,290,270
Patented Dec. 6, 1966

3,290,270
SALICYLIC ACID DERIVATIVES AND
POLYMERS THEREOF
Albert I. Goldberg, Berkeley Heights, N.J., and Joseph
Fertig, New York, and Martin Skoultchi, Bronx, N.Y.,
assignors to National Starch and Chemical Corporation,
New York, N.Y.
No Drawing. Filed May 23, 1963, Ser. No. 282,593
15 Claims. (Cl. 260—47)

This invention relates to the preparation of ethylenically unsaturated derivatives of salicylic acid, the novel derivatives thus prepared, as well as to the polymers derived therefrom.

Polymers and copolymers prepared from ethylenically unsaturated derivatives of aromatic nuclei having hydroxy groups substituted ortho or para to said ethylenically unsaturated groups have a number of interesting properties which have prompted further investigation leading to the synthesis of additional vinyl monomers of this type. Thus, U.S. Patent 2,933,474 reports on the preparation of polymers from both vinyl and allyl salicylate. The latter monomers are prepared by means of an ester exchange reaction whose general method is outlined in U.S. Patent 2,999,862 which in the case of vinyl salicylate, for example, calls for the reaction of salicylic acid with a large excess of vinyl acetate in the presence of catalytic amounts of mercuric acetate. Although this technique is fairly direct, it nonetheless requires a number of post-reaction separation procedures in order to be able to isolate the desired product from the large excess of unreacted vinyl acetate as well as from the acetic acid which is produced as a by-product.

U.S. Patent 2,916,426 discloses the ortho-acrylyl phenols and their subsequent use in the preparation of polymers. The latter monomers are, however, prepared by means of a rather lengthy and tedious three-step process involving esterification of a phenol with beta-chloropropionyl chloride, isomerization of the thus formed ester with aluminum chloride to the ortho-(beta-chloropropionyl) phenol followed by the dehydrohalogenation of the latter with sodium acetate, in alcohol, to give the desired ortho-acrylyl phenol. Needless to say a process of such obvious complexity is not readily adaptable for commercial utilization.

It is the object of this invention to produce a novel class of ethylenically unsaturated derivatives of salicylic acid, said derivatives being capable of undergoing vinyl type polymerization reactions either alone or in the presence of other vinyl type comonomers. A further object of this invention is the preparation of ethylenically unsaturated derivatives of salicylic acid which may be utilized as chelating agents as may also the polymers and copolymers which can be prepared from these derivatives. Various other objects and advantages of this invention will be apparent from a reading of the disclosure which follows hereinafter.

The novel compositions of our invention are the ethylenically unsaturated salicylic acid derivatives which correspond to the formulae:

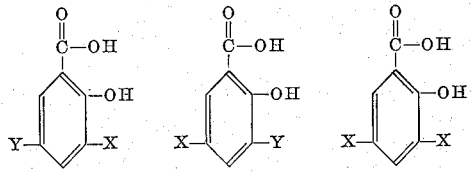

wherein X represents an ethylenically unsaturated radical selected from the group consisting of the acryloxymethyl, i.e.

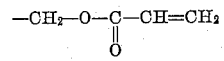

and methacryloxymethyl, i.e.

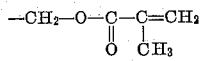

radicals and Y represents a radical selected from the group consisting of the methyl, i.e. —CH$_3$, and hydrogen, i.e. —H, radicals.

The following list is representative of the ethylenically unsaturated salicylic acid derivatives of our invention. For purpose of brevity, this list notes only the acrylyloxymethyl salicylic acid derivatives; however, it is of course to be understood that the corresponding methacrylyloxymethyl salicylic acid derivatives may also be prepared where so desired. One may thus list:

5-acrylyloxymethylsalicylic acid;
3,5-di(acrylyloxymethyl)salicylic acid;
3-methyl-5-acrylyloxymethyl salicylic acid;
3-acrylyloxymethyl salicylic acid; and
3-acrylyloxymethyl-5-methyl salicylic acid.

Thus, it is to be seen that the derivatives of our invention may be described as ethylenically unsaturated derivatives of salicylic acid; or, more specifically, as the acrylyloxymethyl and methacrylyloxymethyl derivatives of salicylic acid wherein said acrylyloxymethyl and methacrylyloxymethyl groups may be substituted on the 3, the 5, or on both the 3 and 5 positions of the salicylic acid molecule, and wherein a methyl group may be substituted on any avaliable 3 or 5 position of said salicylic acid molecule.

All of the above listed compounds, as well as any others which correspond to the above described formulae, are materials which are capable of readily undergoing vinyl type polymerization reactions. They are thus useful for the preparation of homopolymers and, more particularly, for the preparation of copolymers with other vinyl type monomers.

Another useful property characteristic of the novel derivatives of our invention resides in the fact that they may be utilized as chelating agents, i.e. they may be used to remove or scavenge metallic ions from aqueous solutions or from solutions of water soluble organic solvents. Moreover, the same chelating ability is also displayed by the polymers and copolymers which may be derived from our ethylenically unsaturated salicylic acid derivatives.

In brief, the synthesis of our novel derivatives is accomplished by the base catalyzed reaction of a suitable halomethyl salicylic acid intermediate, as defined hereinbelow, together with an alkali metal salt, and particularly the sodium or potassium salt, of an ethylenically unsaturated carboxylic acid selected from the group consisting or acrylic and methacrylic acid.

The halomethyl salicylic acid intermediates, referred to hereinabove, which are applicable for use in the synthesis of our novel derivatives, are compounds corresponding to the following formulae:

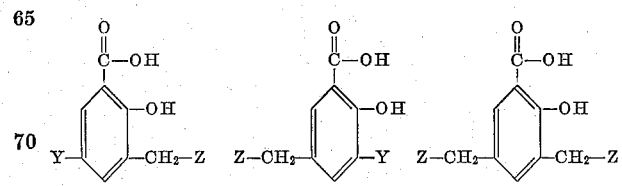

wherein Z represents a halo radical selected from the group consisting of the chloro, i.e. —Cl, and bromo, i.e. —Br, radicals and Y represents a radical selected from the group consisting of the methyl and hydrogen radicals.

The following list is representative of these halomethyl salicylic acid intermediates. For purposes of brevity, this list notes only the chloromethyl salicylic acid intermediates; however, it is of course understood that the corresponding bromomethyl salicylic acid intermediates may also be utilized, where so desired, for preparing the novel derivatives of our invention.

5-chloromethyl salicylic acid;
3,5-di(chloromethyl)salicylic acid;
3-methyl-5-chloromethyl salicylic acid;
3-chloromethyl salicylic acid; and,
3-chloromethyl-5-methyl salicylic acid.

Thus, by utilizing 5-chloromethyl salicylic acid as the intermediate in the process of our invention, the resulting product will be either 5-acrylyloxymethyl salicylic acid or 5-methacrylyloxymethyl salicylic acid; by utilizing 3,5-di-(chloromethyl) salicylic acid as the intermediate, the resulting product will be either 3,5-di(acrylyloxymethyl) salicylic acid or 3,5-di(methacrylyloxymethyl) salicylic acid; by utilizing 3-methyl-5-chloromethyl salicylic acid as the intermediate the resulting product will be either 3-methyl-5-acrylyloxymethyl salicylic acid or 3-methyl-5-methacrylyloxymethyl salicylic acid; by utilizing 3-chloromethyl salicylic acid as the intermediate the resulting product will be either 3-acrylyloxymethyl salicylic acid or 3-methacrylyloxymethyl salicylic acid; and, by utilizing 3-chloromethyl-5-methyl salicylic acid as the intermediate the resulting product will be either 3-acrylyloxymethyl-5-methyl salicylic acid or 3-methacrylyloxymethyl-5-methylsalicylic acid.

It may be noted that 3,5-di(bromomethyl)salicylic acid; 3-bromomethyl-5-chloromethyl salicylic acid; and 3-chloromethyl-5- bromomethyl salicylic acid are all fully equivalent to 3,5-di(chloromethyl)salicylic acid for use in preparing 3,5-di(acrylyloxymethyl) salicylic acid or 3,5-di(methacryloxymethyl)salicylic acid.

For purposes of brevity, all of the above listed chloromethyl intermediates as well as the corresponding bromomethyl compounds which are applicable for use in the process of our invention will be, hereinafter, collectively referred to as the "halomethyl salicylic acid intermediates."

In conducting the above described reaction, the selected halomethyl salicylic acid intermediate is first dissolved in an appropriate solvent such as methyl ethyl ketone, dimethylsulfoxide or acetone. This is followed by the addition of the acrylate or methacrylate salt as well as a basic catalyst such as triethyl amine or other tertiary amines such as tributyl or trimethyl amine. A polymerization inhibitor such as benzoquinone or hydroquinone or its monomethyl ether may also be present so as to prevent the spontaneous polymerization of the desired end product.

Following the initial exothermic reaction, the mixture is maintained under agitation for an additional period of about 1 to 4 hours whereupon the entire reaction mass is drowned, i.e. poured into acidified water, so as to yield a solid or semi-solid product which crystallizes on standing at room temperature. The latter product is then filtered, washed with water, and finally recrystallized from an organic solvent of the type listed hereinabove for use as the reaction medium. For most purposes, including any subsequent polymerization reactions, these crude acrylyloxymethyl and methacrylyloxymethyl derivatives of salicylic acid can then be used without any further purification being necessary.

With respect to proportions, the acrylate or methacrylate salt should be present in a 110–120 percent molar excess over the halomethyl salicylic acid intermediate while the concentration of the polymerization inhibitor and the basic catalyst should be in the range of about 0.01 to 0.1 percent and 1–3 percent, respectively, by weight of the latter intermediate. By means of this reaction, the acrylyloxymethyl and methacrylyloxymethyl derivatives of salicyclic acid are produced in almost quantitative yields.

The halomethyl salicylic acid intermediates for use in synthesizing our novel ethylenically unsaturated derivatives may be prepared by means of reactions well known to those skilled in the art of which the following procedures are merely illustrative. Thus, 5-chloromethyl salicylic acid may be prepared by the chloromethylation of salicylic acid which is accomplished by reacting the latter with a 3 to 6 molar excess of concentrated hydrochloric acid and paraformaldehyde while in the presence of from about 0.5 to 3.0 percent, by weight, of a typical Lewis acid chloromethylation catalyst such as aluminum chloride, zinc chloride or concentrated sulfuric acid. Although the latter chloromethylation procedure is ordinarily preferred, the substitution of hydobromic acid will, of course, yield the corresponding bromomethyl intermediate.

As for 3-methyl-5-chloromethyl salicylic acid and 3-chloromethyl-5-methyl salicylic acid, the latter intermediates are prepared, respectively, by the chloromethylation of 3-methyl salicylic acid and 5-methyl salicylic acid by means of a reaction procedure analogous to that described, hereinabove, for the chloromethylation of salicylic acid.

In preparing 3-bromomethyl salicylic acid, the procedure utilized involves the bromination of 3-methyl salicylic acid by means of a process wherein the latter is first suspended in an inert solvent such as carbon tetrachloride or perchloroethylene. To the latter mixture there is then added an equivalent quantity of bromine dissolved in carbon tetrachloride; the addition of the bromine being accompanied by the irradiation of the suspension of the 3-methyl salicylic acid by exposure of the latter to a tungsten lamp. The resulting mixture is then heated until no more hydrobromic acid is evolved whereupon it is cooled, filtered, washed with small portions of carbon tetrachloride, and finally recrystallized. Although this bromination technique is ordinarily preferred, the corresponding chloromethyl derivative may also be prepared by a variety of chlorination procedures such, for example, as by bubbling gaseous chlorine into the solution of the 3-methyl salicylic acid or by the use of sulfuryl chloride in conjunction with a peroxide type catalyst.

As for 3,5-di(chloromethyl)salicylic acid, the latter intermediate may be prepared by means of a number of different procedures. One technique involves the chloromethylation of either 5-chloromethyl salicylic acid or 3-chloromethyl salicylic acid by means of a reaction procedure analogous to that given hereinabove, for the chloromethylation of salicylic acid. Still another method involves the chlorination of the methyl group in either 3-methyl-5-chloromethyl salicylic acid or 3-chloromethyl-5-methyl salicylic acid by means of one of the reaction procedures described, hereinabove, for the chlorination of 3-methyl salicylic acid. The three equivalents of 3,5-di-(chloromethyl)salicylic acid, i.e. 3,5-di(bromomethyl) salicylic acid; 3-bromomethyl-5-chloromethyl salicylic acid; and, 3-chloromethyl-5-bromomethyl salicylic acid, may all be prepared by the obvious substitution of reagents and starting materials in the various techniques here noted for use in the preparation of 3,5-di(chloromethyl) salicylic acid.

It may also be noted that 5-chloromethyl salicylic acid or 5-bromomethyl salicylic acid can, if desired, be prepared by the chlorination or bromination, respectively, of 5-methyl salicylic acid. However, the above described chloromethylation of salicylic acid is the technique which is ordinarily preferred for the preparation of the intermediate to be used for the preparation of 5-acrylyloxymethyl salicylic acid or 5-methacrylyloxymethyl salicylic acid.

In utilizing our ethylenically unsaturated salicylic acid derivatives in the preparation of homo- and copolymers, there may be employed any of the usual vinyl polymerization methods which are well known to those skilled in the art and which is particularly suited for the polymer whose preparation is desired. Thus, such polymers may be prepared by means of free radical initiated processes utilizing bulk, suspension, solution or emulsion polymerization techniques; or, they may be prepared by ionic catalysts or by means of stereospecific catalysts such as those of the type developed by Ziegler.

The comonomers which may be utilized together with the above described ethylenically unsaturated salicylic acid derivatives for the preparation of the copolymers of our invention can be any ethylenically unsaturated monoer such, for example, as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; methacrylic acid; acrylamide; acrylonitrile; methacrylonitrile; butadiene; isoprene; vinyl propionate; dibutyl maleate; vinylidene chloride; vinyl chloride; vinyl acetate; ethylene; and propylene, etc. Any of these monomers may be used either alone or in combination with one another together with one or more of the acrylyloxymethyl or methacrylyloxymethyl salicylic acid derivatives of our invention.

The copolymers of our invention should contain at least about 1.0 percent, by weight, of these ethylenically unsaturated salicylic acid derivatives in order to be able to function as chelating agents. As for the maximum concentration, this will depend, of course, upon the particular comonomer as well as on the specific end use application of the resulting copolymer. However, in most cases, a concentration of about 50 percent, by weight, will be fully adequate with economically effective results being obtained with a concentration in the range of about 5–25 percent.

In any event, the homo- and copolymers of our invention, whether prepared by means of bulk, suspension, solution of emulsion polymerization techniques, or by other means, are all characterized by their ability to function as chelating agents with a variety of metal ions. It may be noted that the presence of the resulting chelates in the polymer backbone may, in some cases, impart an improved degree of thermal stability to the polymer. The presence of these potential chelating sites in our novel polymers also serves as a means of effecting their subsequent cross-linking as a result of the chelation reaction.

It should be pointed out at this time, that although the process of our invention has been limited to the preparation of the monomeric derivatives, and to the polymers containing the latter, which result from the reaction between the above described halomethyl salicylic acid intermediates with an alkali metal salt of either acrylic or methacrylic acid, it may also be noted that the alkali metal salts of crotonic acid and of the alkyl half esters of maleic, itaconic, fumaric and citraconic acids are also applicable for use in reactions of this type.

Moreover, although the above disclosure has been limited to the reaction between the alkali metal salts of acrylic or methacrylic acid and the above described halomethyl salicylic acid intermediates, it should be understood that the reaction may also be conducted utilizing halomethyl salicylic acid intermediates wherein any available position in the salicylic acid molecule may be substituted as, for example, with one or more alkyl, aryl, alkoxy, or halogeno radicals.

The following examples will further illustrate the embodiment of this invention. In these examples, all parts given are by weight unless otherwise noted.

*Example I*

This example illustrates the preparation of 5-acrylyloxymethyl salicylic acid, i.e.

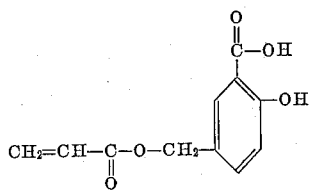

by means of the process of our invention.

In a reaction vessel equipped with means for mechanical agitation, 186.5 parts of 5-chloromethyl salicylic acid were dissolved in 400 parts of acetone. To this solution, there was then added 264.0 parts of potassium acrylate, 3.8 parts of triethyl amine, and 0.2 part of the monomethyl ether of hydroquinone. After the initial exothermic reaction, the resultant slurry was heated, under agitation, to a temperature in the range of 55–60° C. and maintained at that level for a period of two hours. When the reaction was complete, the contents of the reaction vessel were poured into acidified water, yielding a semi-solid mass which crystallized on standing at room temperature. This product was then filtered, washed with water and recrystallized from benzene so as to yield 192.0 parts of 5-acrylyloxymethyl salicylic acid which was equivalent to 87 percent of the theoretical and which had a melting point of 131–133° C.

In a repetition of the above described procedure, a comparable yield of 5-methacrylyloxymethyl salicylic acid was in this case prepared by utilizing potassium methacrylate in place of potassium acrylate.

*Example II*

This example illustrates the preparation of 3-methyl-5-acrylyloxymethyl salicylic acid, i.e.

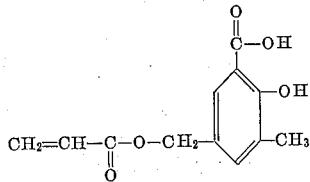

by means of the process of our invention.

In a reaction vessel equipped with means for mechanical agitation, 200.5 parts of 3-methyl-5-chloro-methyl salicyclic acid were dissolved in 400.0 parts of acetone. To this solution, there was then added 264.0 parts of potassium acrylate, 40 parts of triethyl amine, and 0.2 part of the monomethyl ether of hydroquinone. After the initial exothermic reaction, the resultant slurry was heated, under agitation, to a temperature in the range of 55–60° C. and maintained at that level for a period of one hour. When the reaction was complete, the contents of the reaction vessel were poured into acidified water, yielding a semi-solid mass which crystallized on standing at room temperature. This product was then filtered, washed with water and recrystallized from benzene so as to yield 198.0 parts of 3-methyl-5-acrylyloxymethyl salicylic acid which was equivalent to 84 percent of the theoretical and which had a melting point of 120–121° C.

In a repetition of the above described procedure, a comparable yield of 3-methyl-5-methacrylyloxymethyl salicylic acid was in this case prepared by utilizing potassium methacrylate in place of potassium acrylate.

Example III

This example illustrates the preparation of 3-acrylyloxymethyl salicylic acid, i.e.

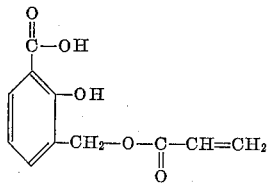

by means of the process of our invention.

In a reaction vessel equipped with means for mechanical agitation, 231.0 parts of 3-bromomethyl salicylic acid were dissolved in 500.0 parts of acetone. To this solution, there was then added 226.0 parts of sodium acrylate, 4.6 parts of triethyl amine, and 0.23 part of the monomethyl ether of hydroquinone. After the initial exothermic reaction, the resultant slurry was heated, under agitation, to a temperature in the range of 60° C. and maintained at that level for a period of three hours. When the reaction was complete, the contents of the reaction vessel were poured into acidified water, yielding a semi-solid mass which crystallized at room temperature. This product was then filtered, washed with water and recrystallized from a mixture of acetone and water so as to yield 195.0 parts of 3-acryloyloxymethyl salicylic acid which was equivalent to 88 percent of the theoretical.

In a repetition of the above described procedure, a comparable yield of 3-methacrylyloxymethyl salicylic acid was in this case prepared by utilizing sodium methacrylate in place of sodium acrylate.

Example IV

This example illustrates the preparation of 3,5-di-(methacrylyloxymethyl)salicylic acid, i.e.

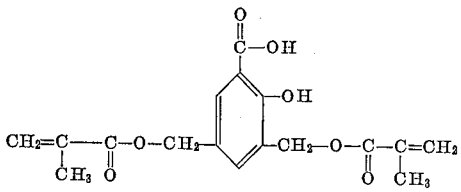

by means of the process of our invention.

In a reaction vessel equipped with means for mechanical agitation, 235.0 parts of 3,5-di(chloromethyl)salicylic acid were dissolved in 700.0 parts of acetone. To this solution, there was then added 409.0 parts of potassium methacrylate, 4.5 parts of triethyl amine, and 0.2 part of the monomethyl ether of hydroquinone. After the initial exothermic reaction, the resultant slurry was heated, under agitation, to a temperature in the range of 60° C. and maintained at that level for a period of four hours. When the reaction was complete, the contents of the reaction vessel were poured into acidified water, thereby yielding a solid mass. This product was then filtered, washed with water and recrystallized from a mixture of acetone and water so as to yield 251.0 parts of 3,5-di(methacrylyloxymethyl)salicylic acid which was equivalent to 75 percent of the theoretical.

In a repetition of the above described procedure, a comparable yield of 3,5-di(acrylyloxymethyl)salicylic acid was in this case prepared by utilizing potassium acrylate in place of potassium methacrylate.

Example V

This example illustrates the preparation of 3-acrylyloxymethyl-5-methyl salicylic acid, i.e.

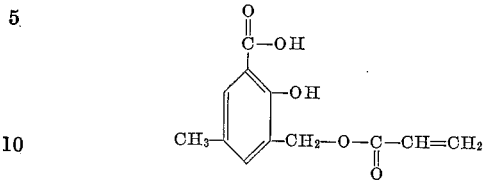

by means of the process of our invention.

In a reaction vessel equipped with means for mechanical agitation, 200.5 parts of 3-chloromethyl-5-methyl salicylic acid were dissolved in 400.0 parts of acetone. To this solution, there was then added 264.0 parts of potassium acrylate, 4.0 parts of triethyl amine, and 0.20 part of the monomethyl ether of hydroquinone. After the initial exothermic reaction, the resultant slurry was heated, under agitation, to a temperature in the range of 55–60° C. and maintained at that level for a period of three hours. When the reaction was complete, the contents of the reaction vessel were poured into acidified water, yielding a semi-solid mass which crystallized on standing at room temperature. This product was then filtered, washed with water and recrystallized from a mixture of acetone and water so as to yield 182.0 parts of 3-acrylyloxymethyl-5-methyl salicylic acid which was equivalent to 77 percent of the theoretical.

In a repetition of the above described procedure, a comparable yield of 3-methacrylyloxymethyl-5-methyl salicylic acid was in this case prepared by utilizing potassium methacrylate in place of potassium acrylate.

Example VI

This example illustrates the preparation of one of the novel copolymers of our invention by means of a solution polymerization technique.

A 50:50 methyl acrylate:5-acrylyloxymethyl salicylic acid copolymer in a 60:40 ethyl acetate:isopropanol solution was prepared by charging the following ingredients into a reactor equipped with a reflux condenser as well as with means for mechanical agitation:

| | Parts |
|---|---|
| Methyl acrylate | 50.0 |
| 5-acrylyloxymethyl salicylic acid (as prepared by means of the procedure of Example I) | 50.0 |
| Azobisisobutyronitrile | 0.2 |
| 60:40 ethyl acetate:isopropanol mixture | 100.0 |

Under agitation, the above mixture was then refluxed for a period of six hours whereupon it was allowed to cool and discharged from the reactor. The resulting lacquer had a resin solids content of 47 percent, by weight, indicating a conversion of 94 percent. Excellent films were readily cast from this lacquer.

Example VII

This example illustrates the preparation of another of the novel copolymers of our invention by means of a solution polymerization technique.

In this case, a 90:10 methyl acrylate:5-acrylyloxymethyl salicylic acid copolymer in a 60:40 ethyl acetate:isopropanol solution was prepared by charging the following ingredients into a reactor equipped with a reflux condenser as well as with means for mechanical agitation:

| | Parts |
|---|---|
| Methyl acrylate | 90.0 |
| 5-acrylyloxymethyl salicylic acid (as prepared by means of the procedure of Example I) | 10.0 |
| Benzoyl peroxide | 0.5 |
| 60:40 ethyl acetate:isopropanol mixture | 200.0 |

Under agitation, the above mixture was then refluxed for a period of seven hours whereupon it was allowed to cool and discharged from the reactor. The resulting lacquer had a resin solids content of 31 percent, by weight, indicating a conversion of 93 percent. Excellent films were readily cast from this lacquer.

Example VIII

This example illustrates the preparation of one of the novel homopolymers of our invention by means of a solution polymerization technique.

A dry, solid homopolymer of 5-acrylyloxymethyl salicylic acid was prepared by charging the following ingredients to a reactor equipped with a reflux condenser as well as with means for mechanical agitation:

| | Parts |
|---|---|
| 5-acrylyloxymethyl salicylic acid (as prepared by means of the procedure of Example I) | 20.0 |
| Benzoyl peroxide | 0.5 |
| Ethyl acetate | 80.0 |

Under agitation, the above mixture was then refluxed for a period of two hours during which time the resulting homopolymer precipitated out of the solution. It was then recovered by filtration and upon drying 19.0 parts of solid homopolymer were obtained which indicated a conversion of 95 percent. This product could be redissolved and readily yielded clear, brittle films.

Example IX

This example illustrates the preparation of another of the novel homopolymers of our invention by means of a solution polymerization technique.

A toluene lacquer of the homopolymer of 3-methyl-5-arcylyloxymethyl salicylic acid was prepared by charging the following ingredients into a reactor equipped with a reflux condenser as well as with means for mechanical agitation:

| | Parts |
|---|---|
| 3-methyl-5-acrylyloxymethyl salicylic acid (as prepared by means of the procedure of Example II) | 40.0 |
| Tertiary butyl hydroperoxide | 0.75 |
| Toluene | 60.0 |

Under agitation, the above mixture was then refluxed for a period of six hours whereupon it was allowed to cool and discharged from the reactor. The resulting lacquer had a resin solids content of 38 percent by weight, indicating a conversion of 95 percent. Very brittle films were readily cast from this lacquer.

Example X

This example illustrates the preparation of another of the novel copolymers of our invention by means of a solution polymerization technique.

A 95:5 methyl acrylate:3-methyl-5-acrylyloxymethyl salicylic acid copolymer in ethyl acetate was prepared by charging the following ingredients into a reactor equipped with a reflux condenser as well as with means for mechanical agitation:

| | Parts |
|---|---|
| Methyl acrylate | 95.0 |
| 3-methyl-5-acrylyloxymethyl salicylic acid (as prepared by means of the procedure of Example II) | 5.0 |
| Benzoyl peroxide | 0.5 |
| Ethyl acetate | 200.0 |

Under agitation, the above mixture was then refluxed for a period of three hours whereupon it was allowed to cool and discharged from the reactor. The resulting lacquer had a resin solids content of about 33 percent, by weight, indicating a complete conversion of monomer to polymer. Excellent films were readily cast from this lacquer.

Example XI

This example illustrates the preparation of another of the novel copolymers of our invention by means of a solution polymerization technique.

An 88:12 vinyl acetate:3-methyl-5-acrylyloxymethyl salicylic acid copolymer in ethyl acetate was prepared by charging the following ingredients into a reactor equipped with a reflux condenser, a slow addition funnel, and means for mechanical agitation:

| | Parts |
|---|---|
| Vinyl acetate | 80.0 |
| 3-methyl-5-acrylyloxymethyl salicylic acid (as prepared by means of the procedure of Example II) | 1.0 |
| Benzoyl peroxide | 0.5 |
| Ethyl acetate | 80.0 |

While the above described mixture was being refluxed, under agitation, there was added thereto an addition 9.0 parts of 3-methyl-5-acrylyloxymethyl salicylic acid, 10.0 parts of vinyl acetate and 36.0 parts of ethyl acetate; the addition of the latter ingredients taking place over a period of three hours. The resulting lacquer had a resin solids content of 41 percent, by weight, indicating a conversion of 88 percent. Analysis indicated that the copolymer contained 12 percent, by weight, of the copolymerized 3-methyl-5-acrylyloxymethyl salicylic acid. Homogenous films were readily cast from this lacquer.

In a repetition of the above described procedure, a 61:39 vinyl acetate:3-methyl-5-acryloxymethyl salicylic acid copolymer lacquer was prepared by varying the proportions of the respective monomers in the reaction mixture.

Example XII

This example illustrates the preparation of another of the novel copolymers of our invention by means of a solution polymerization technique.

A 70:30 ethyl acrylate:3-methyl-5-acrylyloxymethyl salicylic acid copolymer in ethyl acetate was prepared by charging the following ingredients into a reactor equipped with a reflux condenser as well as with means for mechanical agitation:

| | Parts |
|---|---|
| Ethyl acrylate | 70.0 |
| 3-methyl-5-acrylyloxymethyl salicylic acid (as prepared by means of the procedure of Example II) | 30.0 |
| Benzoyl peroxide | 0.5 |
| Ethyl acetate | 200.0 |

Under agitation, the above mixture was then refluxed for a period of eight hours whereupon it was allowed to cool and discharged from the reactor. The resulting lacquer had a resin solids content of 32.6 percent, by weight, indicating a conversion of 99 percent. Excellent films were readily cast from this lacquer.

Example XIII

This example illustrates the preparation of a novel terpolymer of our invention by means of an aqueous emulsion polymerization technique.

A 75:24:1.0 ethyl acrylate:methyl methacrylate:3,5-di(methacryloxymethyl)salicylic acid terpolymer in aqueous emulsion form was prepared by charging the following ingredients into a reactor equipped with a reflux condenser as well as with means for mechanical agitation:

| | Parts |
|---|---|
| Ethyl acrylate | 75.0 |
| Methyl methacrylate | 24.0 |
| 3,5 - di(methacrylyloxymethyl)salicylic acid (as prepared by means of the procedure of Example IV) | 1.0 |
| The sodium salt of an alkyl aryl poly ether sulfonate (an anionic surfactant) | 6.0 |
| Ammonium persulfate | 0.25 |
| Sodium bisulfite | 0.25 |
| Water | 120.0 |

The above mixture was then heated to a temperature of 60° C. and maintained at that level for a period of one hour there effecting an exothermic copolymerization reaction. The resulting latex has a resin solids content of 40 percent, by weight, indicating a conversion of 90 percent. Films were readily cast from this latex. The latter films were found to be 91 percent, by weight, insoluble in acetone which indicated that they had been cross-linked as a result of the presence in this terpolymer of the difunctional 3,5-di(methacrylyloxymethyl)salicylic acid moieties.

*Example XIV*

This example illustrates the chelating ability of one of the novel derivatives of our invention.

A solution of 23.6 parts of 3-methyl-5-acryloxymethyl salicylic acid, as prepared by means of the procedure of Example II, was made up in 100.0 parts of a 1:1 mixture of ethanol and water. To the latter solution, there was then added a solution of 10.0 parts of cupric acetate monohydrate in 50.0 parts of a 1:1 mixture of ethanol and water. A precipitate of a blue-green copper chelate was immediately formed. This precipitate was then filtered, washed with aqueous ethanol and dried. Repeated extraction of this solid with warm water did not produce any loss in weight thereby indicating that the copper was tightly bound in the form of a chelate. However, treatment with 6 N hydrochloric acid caused decomposition of the chelate to cupric chloride and the 3-methyl-5-acryloxymethyl salicylic acid.

*Example XV*

This example illustrates the chelating ability of one of the novel copolymers of our invention.

A portion of the 95:5 methyl acrylate:3-methyl-5-acryloxymethyl salicylic acid copolymer lacquer, whose preparation was described in Example X, was diluted with ethyl acetate so that the resulting solution had a resin solids content of 30 percent, by weight. To 200 parts of this copolymer solution, there was then added a solution of 1.5 parts of cupric acetate monohydrate in 80.0 parts of a 1:1 mixture of methanol and ethyl acetate. Similar mixtures were also prepared each of which contained 200 parts of the diluted copolymer lacquer in admixture, respectively, with the following salt solutions: 1.3 parts cupric chloride dihydrate in 80.0 parts of a 1:1 mixture of methanol and ethyl acetate; 1.9 parts cobalt diacetate tetrahydrate in 80.0 parts of a 1:1 mixture of methanol and ethyl acetate; and, 0.8 part of basic aluminum acetate in 80.0 parts of a 1:1 mixture of methanol and ethyl acetate.

Each of the above described copolymer-salt mixtures gelled immediately subsequent to their preparation with the exception of the mixture of the copolymer with the cupric chloride dihydrate which remained in solution form. These gels were the various chelates which had been formed between the copolymer and the various metal ions of the respective salts. This was readily demonstrated by the addition, to each gel, of 20 drops of concentrated hydrochloric acid which resulted in the decomposition of the gels to their respective copolymer and salt components which were, of course, returned to the form of a homogeneous solution. Films having a wet thickness of 12 mils were thereupon cast from these solutions. These films were then air dried and heated at 130° C. for a period of 30 minutes. These cured films were found to be insoluble in acetone which was indicative of the fact that the chelates had been reformed inasmuch as comparable films derived from a sample of the copolymer lacquer to which a salt solution had not been added were found, in contrast, to be soluble in acetone after having been subjected to the identical curing schedule.

In the case of the mixture of the copolymer with cupric chloride dihydrate which had not, as noted above, formed a gel upon its preparation, there were cast, therefrom, films having a wet thickness of 12 mils. These films were air dried and heated at 130° C. for 30 minutes whereupon they were found to be acetone insoluble. The latter fact was again indicative of the formation of a chelate since, as noted earlier, films derived from a sample of the copolymer lacquer to which a salt solution had not been added were found, in contrast, to be soluble in acetone after having been subjected to the identical curing schedule.

Summarizing, our invention is thus seen to provide a novel class of monomers and polymers both of which may be utilized as chelating agents. Variations may be made in procedures, proportions and materials without departing from the scope of our invention which is limited only by the following claims.

What is claimed is:

1. The ethylenically unsaturated salicylic acid derivatives which correspond to:

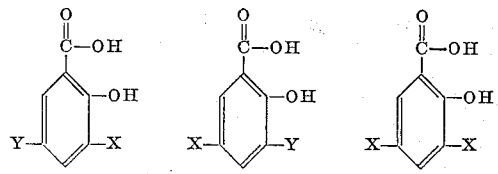

wherein X represents an ethylenically unsaturated radical selected from the group consisting of the acrylyloxymethyl and methacrylyloxymethyl radicals and Y represents a radical selected from the group consisting of the methyl and hydrogen radicals.

2. The ethylenically unsaturated salicylic acid derivatives selected from the group consisting of:
   5-acrylyloxymethyl salicylic acid;
   3,5-di(acrylyloxymethyl)salicylic acid;
   3-methyl-5-acrylyloxymethyl salicylic acid;
   3-acrylyloxymethyl salicylic acid;
   3-acrylyloxymethyl-5-methyl salicylic acid;
   5-methacrylyloxymethyl salicylic acid;
   3,5-di(methacrylyloxymethyl)salicylic acid;
   3-methyl-5-methacrylyloxymethyl salicylic acid;
   3-methacrylyloxymethyl salicylic acid; and
   3-methacrylyloxymethyl-5-methyl salicylic acid.

3. A composition comprising a polymer of at least one ethylenically unsaturated salicylic acid derivative corresponding to the formulae:

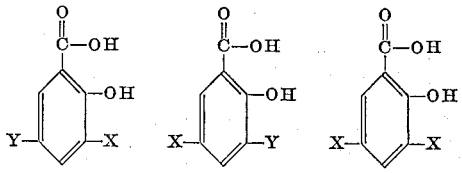

wherein X represents an ethylenically unsaturated radical selected from the group consisting of the acrylyloxymethyl and methacrylyloxymethyl radicals and Y represents a radical selected from the group consisting of the methyl and hydrogen radicals.

4. The composition of claim 3, wherein said ethylenically unsaturated salicylic acid derivative is selected from the group consisting of:
   5-acrylyloxymethyl salicylic acid;
   3,5-di(acrylyloxymethyl)salicylic acid;
   3-methyl-5-acrylyloxymethyl salicylic acid;
   3-acrylyloxymethyl salicylic acid;
   3-acrylyloxymethyl-5-methyl salicylic acid;
   5-methacrylyloxymethyl salicylic acid;
   3,5-di(methacrylyloxymethyl)salicylic acid;
   3-methyl-5-methacrylyloxymethyl salicylic acid;
   3-methacrylyloxymethyl salicylic acid; and
   3-methacrylyloxymethyl-5-methyl salicylic acid.

5. A composition comprising a polymer of at least one ethylenically unsaturated monomer together with at least one ethylenically unsaturated salicylic acid derivative corresponding to:

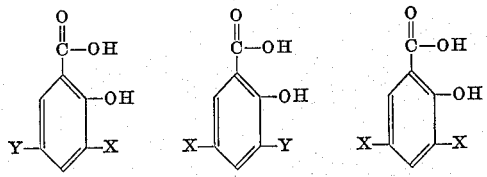

wherein X represents an ethylenically unsaturated radical selected from the group consisting of the acrylyloxymethyl and methacrylyoxymethyl radicals and Y represents a radical selected from the group consisting of the methyl and hydrogen radicals.

6. The composition of claim 5, wherein said ethylenically unsaturated salicylic acid derivative is selected from the group consisting of:
5-acrylyoxymethyl salicylic acid;
3,5-di(acrylyloxymethyl)salicylic acid;
3-methyl-5-acrylyloxymethyl salicylic acid;
3-acrylyloxymethyl salicylic acid;
3-acrylyloxymethyl-5-methyl salicylic acid;
5-methacrylyloxymethyl salicylic acid;
3,5-di(methacrylyloxymethyl)salicylic acid;
3-methyl-5-methacrylyloxymethyl salicylic acid;
3-methacrylyloxymethyl salicylic acid; and
3-methacrylyloxymethyl-5-methyl salicylic acid.

7. The composition of claim 5, wherein, said ethylenically unsaturated salicylic acid derivative is present in a proportion of at least about 1.0 percent, by weight.

8. The composition of claim 5, wherein said ethylenically unsaturated monomer is selected from among the group consisting of: styrene; alpha-methyl styrene; the acrylic and methacrylic acid esters of aliphatic alcohols; acrylic acid; methacrylic acid; acrylamide; acrylonitrile; methacrylonitrile; butadiene; isoprene; vinyl propionate; dibutyl maleate; vinylidene chloride; vinyl chloride; vinyl acetate; ethylene; and propylene.

9. The homopolymer of 5-acrylyloxymethyl salicylic acid.

10. The homopolymer of 3-methyl-5-acrylyloxymethyl salicylic acid.

11. The copolymer of methyl acrylate and 5-acrylyloxymethyl salicylic acid.

12. The copolymer of methyl acrylate and 3-methyl-5-acrylyloxymethyl salicylic acid.

13. The copolymer of vinyl acetate and 3-methyl-5-acrylyloxymethyl salicylic acid.

14. The copolymer of ethyl acrylate and 3-methyl-5-acrylyloxymethyl salicylic acid.

15. The terpolymer of 3,5-di(methacrylyloxymethyl) salicylic acid, ethyl acrylate and methyl methacrylate.

References Cited by the Examiner

UNITED STATES PATENTS

| | | | |
|---|---|---|---|
| 2,401,261 | 5/1946 | MacMullen | 260—47 |
| 2,765,224 | 10/1956 | Lambrech | 260—47 |
| 3,133,042 | 5/1964 | Tocker | 260—47 |

OTHER REFERENCES

Migrdichian: Organic Synthesis, vol. I, p. 326, Reinhold Publishing Corp., New York (1957), QD 262 M 55.

SAMUEL H. BLECH, *Primary Examiner.*

WILLIAM H. SHORT, *Examiner.*

J. C. MARTIN, L. P. QUAST, *Assistant Examiners.*